(12) United States Patent
Chen et al.

(10) Patent No.: US 11,770,460 B2
(45) Date of Patent: Sep. 26, 2023

(54) METHOD AND SYSTEM FOR SHARING MULTI-PROTOCOL PORT, AND SERVER

(71) Applicant: Wangsu Science & Technology Co., Ltd., Shanghai (CN)

(72) Inventors: Xiangxiang Chen, Shanghai (CN); Xiaochuan Zhuang, Shanghai (CN)

(73) Assignee: WANGSU SCIENCE AND TECHNOLOGY CO., LTD., Shanghai (CN)

( * ) Notice: Subject to any disclaimer, the term of this patent is extended or adjusted under 35 U.S.C. 154(b) by 217 days.

(21) Appl. No.: 17/111,314

(22) Filed: Dec. 3, 2020

(65) Prior Publication Data

US 2022/0038559 A1     Feb. 3, 2022

Related U.S. Application Data

(63) Continuation of application No. PCT/CN2020/114054, filed on Sep. 8, 2020.

(30) Foreign Application Priority Data

Aug. 3, 2020   (CN) .......................... 202010768976.9

(51) Int. Cl.
   *H04L 69/18*   (2022.01)
   *H04L 67/02*   (2022.01)
   *H04L 69/08*   (2022.01)
   *H04L 69/16*   (2022.01)

(52) U.S. Cl.
   CPC .............. *H04L 69/18* (2013.01); *H04L 67/02* (2013.01); *H04L 69/08* (2013.01); *H04L 69/16* (2013.01)

(58) Field of Classification Search
   CPC ......... H04L 69/18; H04L 67/12; H04L 69/08; H04L 69/16

(Continued)

(56) References Cited

U.S. PATENT DOCUMENTS

2010/0106841 A1*  4/2010  Barnert ................. H04L 67/56
                                                          709/227
2014/0280515 A1    9/2014  Wei et al.
(Continued)

FOREIGN PATENT DOCUMENTS

CN         1668030 A     9/2005
CN       107222484 A     9/2017
(Continued)

OTHER PUBLICATIONS

Wangsu Science & Technology Co., Ltd., Extended European Search Report, EP 20810851.4, dated Nov. 22, 2021, 10 pgs.

(Continued)

*Primary Examiner* — Alan S Chou
(74) *Attorney, Agent, or Firm* — USCH Law, PC

(57) ABSTRACT

The present disclosure discloses a method and system for sharing a multi-protocol port and a server, where a designated field for storing a listening structure is newly added to a listening structure of an HTTP protocol. The method includes: writing, with respect to a target port, a listening structure of an RTMP protocol into the designated field of the HTTP protocol if the HTTP protocol and the RTMP protocol share the target port; detecting a target protocol corresponding to a connection request when the connection request is received by the target port; and reading the listening structure of the RTMP protocol from the designated field to obtain configuration information of the RTMP protocol if the target protocol is the RTMP protocol, and processing the connection request using the configuration information of the RTMP protocol.

18 Claims, 3 Drawing Sheets

---

S1: If there is a target port shared by an http protocol and a rtmp protocol, with respect to the target port, a monitoring structure of the rtmp protocol is written into a designated field of the http protocol.

S3: When a connection request is received by the target port, a target protocol corresponding to the connection request is detected.

S5: If the target protocol is the rtmp protocol, the monitoring structure of the rtmp protocol is read from the designated field to obtain configuration information of the rtmp protocol, and the connection request is processed through the configuration information of the rtmp protocol.

(58) Field of Classification Search
USPC .......................................................... 370/329
See application file for complete search history.

(56) References Cited

U.S. PATENT DOCUMENTS

| | | | |
|---|---|---|---|
| 2019/0007716 A1* | 1/2019 | Shi ........................ | H04L 65/611 |
| 2020/0344498 A1* | 10/2020 | Lazar .................. | H04N 21/234 |
| 2021/0084016 A1* | 3/2021 | Dadhich .............. | H04L 63/166 |

FOREIGN PATENT DOCUMENTS

| | | |
|---|---|---|
| CN | 109510737 A | 3/2019 |
| CN | 109889911 A | 6/2019 |
| CN | 110266822 A | 9/2019 |
| CN | 110875897 A | 3/2020 |

OTHER PUBLICATIONS

Kennylevinsen, "GitHub-kennylevinsen/serve2d: Protocol detecting," Retrieved from the Internet: URL:https://github.com/kennylevinsen/serve2d, May 28, 2016, 5 pgs.

Anonymous, "Go-Webserver listening for mutiple protocols (HTTP and RTMP) on the same port," Retrieved from the Internet: URL:https://stackoverflow.com/questions/40336038/go-webserver-listening-for-multiple-protocols-http-and-rtmp-on-the-same-port, Oct. 31, 2016, 3 pgs.

Wangsu Science & Technology Co., Ltd., PCT International Search Report, PCT/CN2020/114054, dated Apr. 29, 2021, 4 pgs.

* cited by examiner

METHOD AND SYSTEM FOR SHARING MULTI-PROTOCOL PORT, AND SERVER

CROSS REFERENCE TO RELATED APPLICATIONS

The present application is a continuation of PCT Patent Application No. PCT/CN2020/114054, entitled "METHOD AND SYSTEM FOR SHARING MULTI-PROTOCOL PORT, AND SERVER," filed Sep. 8, 2020, which claims priority to Chinese patent application No. 202010768976.9, entitled "METHOD AND SYSTEM FOR SHARING MULTI-PROTOCOL PORT, AND SERVER," filed Aug. 3, 2020, each of which is incorporated by reference herein in its entirety.

TECHNICAL FIELD

The present disclosure relates to Internet technologies, in particular to a method and system for sharing a multi-protocol port, and a server.

BACKGROUND

A current Nginx architecture may mainly provide a hypertext transfer protocol (HTTP) service. In addition, an open source real time messaging protocol (RTMP) module based on an Nginx may provide a RTMP service. In some application scenarios, a HTTP protocol and a RTMP protocol may share the same port. For example, the HTTP protocol and the RTMP protocol may share a port 1935 or a port 443, and in this way, the Nginx architecture needs to provide both the HTTP service and the RTMP service.

When multiple protocols listen to the same port together, a connection request may be randomly handed over to the HTTP protocol or the RTMP protocol for processing if the connection request is received by the port. However, if the connection request of the HTTP service is processed by the RTMP protocol, or the connection request of the RTMP service is processed by the HTTP protocol, data anomalies may be caused. Therefore, there is an urgent need for an effective solution to avoid the data anomaly when multiple protocols share the same port.

SUMMARY

Some embodiments of the present disclosure provide a method and system for sharing a multi-protocol port, and a server, which can avoid occurrence of data anomalies.

In order to achieve the above purpose, an aspect of the present disclosure provides a method for sharing a multi-protocol port, where a designated field for storing a listening structure is newly added to a listening structure of an HTTP protocol; and the method includes: writing, with respect to a target port, a listening structure of a RTMP protocol into the designated field of the HTTP protocol if the HTTP protocol and the RTMP protocol share the target port; detecting a target protocol corresponding to a connection request when the connection request is received by the target port; and reading the listening structure of the RTMP protocol from the designated field to obtain configuration information of the RTMP protocol if the target protocol is the RTMP protocol, and processing the connection request through the configuration information of the RTMP protocol.

In order to achieve the above purpose, another aspect of the present disclosure further provides a system for sharing a multi-protocol port, where a designated field for storing a listening structure is newly added to a listening structure of an HTTP protocol; and the system includes: a listening structure filling unit, configured to write, with respect to a target port, a listening structure of a RTMP protocol into the designated field of the HTTP protocol if the HTTP protocol and the RTMP protocol share the target port; a protocol detection unit, configured to detect a target protocol corresponding to a connection request when the connection request is received by the target port; and a configuration information reading unit, configured to read the listening structure of the RTMP protocol from the designated field to obtain configuration information of the RTMP protocol if the target protocol is the RTMP protocol, and process the connection request through the configuration information of the RTMP protocol.

In order to achieve the above purpose, yet another aspect of the present disclosure further provides a server in which an Nginx system is deployed, the server includes a memory and a processor, where the memory is configured to store a computer program which, when executed by the processor, causes the processor to perform the method for sharing the multi-protocol port as described above.

It can be seen from the above that in the technical solution provided in one or more embodiments of the present disclosure, the designated field for storing the listening structure may be newly added to the listening structure of the HTTP protocol. When the HTTP protocol and the RTMP protocol share the same target port, the listening structure of the RTMP protocol may be written into the designated field, so that the connection request received by the target port may be uniformly listened by the HTTP protocol first. Subsequently, with respect to the connection request listened by the HTTP protocol, the target protocol corresponding to the connection request may be detected. If the target protocol is the HTTP protocol, the connection request may be processed normally by the HTTP protocol. If the target protocol is the RTMP protocol, the connection request should be handed over to the RTMP protocol for processing. Specifically, since the listening structure of the RTMP protocol is written into the designated field, the listening structure of the RTMP protocol may be read from the designated field, so that the configuration information of the RTMP protocol may be obtained, and the RTMP protocol may be able to process the connection request through the configuration information. Through the above solution, the HTTP protocol may be used to uniformly listen the shared target port, and then a step of the protocol detection may be added. The connection request may be handed over to the corresponding protocol for processing, thus avoiding occurrence of data anomalies.

BRIEF DESCRIPTION OF THE DRAWINGS

In order to illustrate the technical solution in the embodiments of the present disclosure more clearly, the accompanying drawings used in the description of the embodiments are briefly introduced below. It is apparent that the drawings descripted below are only some embodiments of the present disclosure. For those skilled in the art, other drawings may be obtained in accordance with these drawings without any creative work.

DETAILED DESCRIPTION

In order to make the objectives, technical solutions and advantages of the present disclosure clearer, the technical solutions of the present disclosure will be described clearly and completely with reference to specific embodiments of the present disclosure and corresponding drawings. It is apparent that the described embodiments are only some rather than all embodiments of the present disclosure. Based on the embodiments in the present disclosure, all other embodiments obtained by those skilled in the art without creative work are within the protection scope of the present disclosure.

The present disclosure provides a method for sharing a multi-protocol port, which may improve an existing Nginx architecture, so that data anomalies may not occur when multiple protocols share the same port.

Specifically, a designated field opaque may be newly added to an ngx_listening_t structure of an Nginx, and the designated field may be configured to save a listening structure of the protocol. In practical applications, since contents of a RTMP protocol such as a certificate are usually processed in the HTTP protocol when the HTTP protocol and the RTMP protocol share the same port, the shared port may be uniformly listened by the HTTP protocol and the RTMP protocol may not listen the port in order to solve the problem of data anomalies caused by the HTTP protocol and the RTMP protocol sharing the same port. In this way, a connection request received by the port may be initially listened by the HTTP protocol, and subsequently, a protocol actually supported by the connection request may be identified and handed over to the corresponding protocol for processing.

Figure 1:
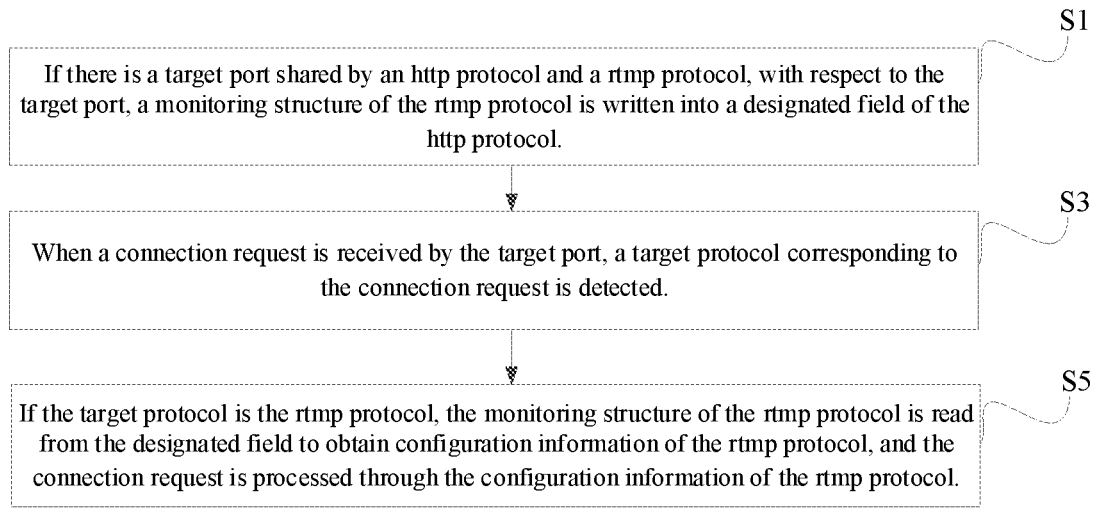
FIG. 1 is a step diagram of a method for sharing a multi-protocol port in an embodiment of the present disclosure.

Referring to FIG. 1, the method for sharing the multi-protocol port provided in one embodiment of the present disclosure may include the following steps.

In step S1, if the HTTP protocol and the RTMP protocol share a target port, with respect to the target port, a listening structure of the RTMP protocol is written into the designated field of the HTTP protocol.

In this embodiment, since the connection request is uniformly listened by the HTTP protocol, the above designated field opaque may be newly added to the listening structure of the HTTP protocol. Then, it may be judged whether there is the target port shared by the HTTP protocol and the RTMP protocol by traversing a listening link list.

In practical applications, the listening link list may be traversed through a cycle→listening→elts operation in the Nginx. By traversing the listening link list, various listening structures that are currently listening the port may be listed. Through a listing result, whether there are multiple protocols listening the same port at the same time may be identified. If there is a target port listened by the HTTP protocol and the RTMP protocol at the same time, it means that the target port is shared by the HTTP protocol and the RTMP protocol. At this time, the listening structure of the RTMP protocol may be written into the designated field opaque of the HTTP protocol, and the listening structure of the RTMP protocol listening the target port may be set to an ignore state (note that it is the original listening structure of the RTMP protocol that is set to the ignore state here, not the listening structure written into the designated field opaque). Specifically, a parameter value of an ignore parameter in the listening structure of the RTMP protocol may be set to 1, which indicates that the listening structure of the RTMP protocol does not listen the target port.

In this embodiment, after writing the listening structure of the RTMP protocol into the designated field opaque of the HTTP protocol and setting the listening structure of the RTMP protocol to the ignore state, the process of the cycle→listening→elts may be modified in order to avoid counting the listening structure of the RTMP protocol when traversing the listening link list. Specifically, in one embodiment, a rule may be added to stipulate that the listening structure with the parameter value 1 of the ignore parameter is not counted. In this way, when traversing the listening link list, with regard to the target port, only the listening structure of the HTTP protocol not the listening structure of the RTMP protocol is counted since the parameter value of the ignore parameter in the listening structure of the RTMP protocol is 1, thus avoiding that there are two or more protocols listening the target port at the same time in the statistical result. In addition, in another embodiment, an initialization function in an event module may also be modified. Specifically, with respect to the initialization function ngx_event_process_init in the event module, a judgment condition may be added when traversing the listening link list. The judgment condition may be that if the parameter value of the ignore parameter in a current listening structure is 1, then the listening structure is not counted. In this way, through the above method, the listening structure in the ignore state may not be counted when traversing the listening link list, so that subsequent event module does not perform an epoll operation on the listening structure in the ignore state.

In practical applications, there may be a HTTP/2 protocol listening the port in addition to the HTTP protocol and the RTMP protocol. However, since a configuration structure of the HTTP/2 protocol is the same as that of the HTTP protocol, no additional processing is required for the HTTP/2 protocol.

In this embodiment, the listening structures of the HTTP protocol and the RTMP protocol may be in different positions in the listening link list, so it is usually necessary to perform the above settings with respect to a shared port after all the contents in the listening link list have been parsed. In view of this, the above process of setting the shared port may be performed in a core module of the RTMP protocol. The reason is that the core module of the RTMP protocol may provide an initialization function (init_conf) which may be executed just after the listening link list has been parsed and before a subsequent socket function (ngx_open_listening_ sockets) is called. In this way, by executing the initialization function provided by the core module of the RTMP protocol, the target port shared by the HTTP protocol and the RTMP protocol may be accurately detected.

In step S3, when the connection request is received by the target port, a target protocol corresponding to the connection request is detected.

In this embodiment, after the processing in step S1, the target port shared by the HTTP protocol and the RTMP protocol may be uniformly listened by the HTTP protocol. In this way, the connection request entering the target port is usually received by a listening processing function (ngx_ http_init_connection) of the HTTP protocol.

Figure 2:
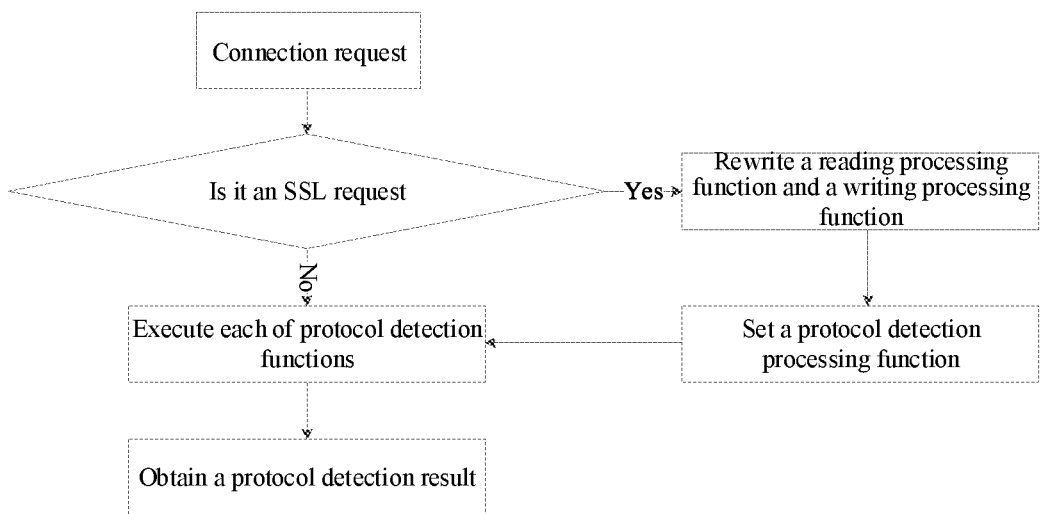
FIG. 2 is a schematic diagram of processing a connection request in an embodiment of the present disclosure.

Referring to FIG. 2, in one embodiment, the listening processing function of the HTTP protocol may first judge whether the connection request is a secure sockets layer (SSL) request after receiving the connection request, and a handshake phase of a SSL protocol shall be executed first if the connection request is the SSL request. After the handshake of the SSL protocol is completed, it is necessary to detect the target protocol actually corresponding to the connection request in order to use a correct protocol to process the connection request. Specifically, a protocol detection module may be newly added in the Nginx architecture, which may be implemented by the core module of the Nginx. In the protocol detection module, a hook injection interface and a hook chain execution interface may be provided. Herein, the hook injection interface may be called by different protocols. When the hook injection interface is called, the different protocols may hook their newly added protocol detection functions into a hook through the hook injection interface. In practical applications, all protocols except the HTTP protocol may newly add their own protocol detection functions, and may hook the respective protocol detection functions into the hook by calling the hook injection interface. For example, the HTTP/2 protocol and the RTMP module may push handles of corresponding protocol detection functions into a hook chain list through an array insertion function ngx_array_push, thus completing the process of adding the protocol detection functions.

In this embodiment, after the process of adding the protocol detection functions is completed, each of the protocol detection functions hooked into the hook may be traversed when the hook chain execution interface is called and these protocol detection functions may be executed in sequence, so as to detect the target protocol actually corresponding to the connection request.

In practical applications, in order to deal with the above protocol detection process, an original epoll read-write processing function needs to be rewritten after the handshake of the SSL protocol is completed. Specifically, a reading processing function recv and a writing processing function send of the epoll operation may be rewritten into a reading processing function ngx_ssl_recv and a writing processing function ngx_ssl_write of the SSL protocol respectively. In this way, the reading and writing of underlying data may be executed through the rewritten functions. Through the rewritten functions, a series of operations such as receiving, decrypting, encrypting, and sending data may be completed, and these operations are transparent to an upper layer.

In this embodiment, after completing the rewriting of the underlying read-write processing function, a protocol detection processing function ngx_http_protocol_detect may further be set in order to perform the protocol detection process, through which the target protocol corresponding to the connection request may be detected.

Specifically, when the ngx_http_protocol_detect is executed, the above hook chain execution interface may be called first, and multiple preset protocol detection functions may be sequentially executed through the hook chain execution interface. Herein, if the target protocol corresponding to the connection request is detected by the current protocol detection function, an indicator NGX_DONE indicating that the detection is completed may be returned, which means that the target protocol corresponding to the connection request has been identified. If the target protocol corresponding to the connection request is not detected by the current protocol detection function, an indicator NGX_DECLINED indicating that the detection is to be continued may be returned, which means that the connection request may not identify the target protocol through the current protocol detection function. At this time, the target protocol corresponding to the connection request may be detected through a next protocol detection function. If all the multiple protocol detection functions have been executed and the target protocol corresponding to the connection request is still not detected, an indicator NGX_OK indicating that the detection ends may be returned at this time, and subsequently, the connection request may be processed by the HTTP protocol. In addition, in the process of the protocol detection, an indicator NGX_ERROR indicating that the detection fails may be returned if an anomaly occurs, thus ending the current protocol detection process.

In this embodiment, when performing the protocol detection, it is usually only necessary to obtain partial data of the connection request. For example, with respect to the protocol detection function of the RTMP protocol, only a first byte of data of the connection request needs to be detected; while with respect to the protocol detection function of the HTTP/2 protocol, first four bytes of data of the connection request need to be detected. In view of this, after judging whether the connection request is the SSL request, a data reading mode that matches the judgment result may be adopted to read the partial data of the connection request. Herein, with respect to the SSL request, a mode through calling a data snoop function SSL_peek may be used for data reading; while with respect to a non-SSL request, a mode through setting a parameter MSG_PEEK in the reading processing function recv may be used for data reading. Herein, with respect to the SSL request, the rewritten read-write processing function of the SSL protocol may be adopted to obtain the partial data of the connection request. In this way, the target protocol corresponding to the connection request may be detected through the read partial data.

In this embodiment, when performing the protocol detection on the partial data, a target length of the partial data required to be read may be determined according to a type of the current protocol detection function. For example, the RTMP protocol only needs to read the first byte of data, while the HTTP/2 protocol needs to read the first four bytes of data. In this way, if the length of data that is currently read does not reach the target length, an indicator NGX_AGAIN indicating that the detection is continued may be returned to wait for more data to be read until the length of the read data reaches the target length.

In one embodiment, the handshake process of the SSL protocol may not be performed if the connection request is not the SSL request, and the protocol detection process may be directly performed.

In step S5, if the target protocol is the RTMP protocol, the listening structure of the RTMP protocol is read from the designated field to obtain configuration information of the RTMP protocol, and the connection request is processed through the configuration information of the RTMP protocol.

Figure 3:
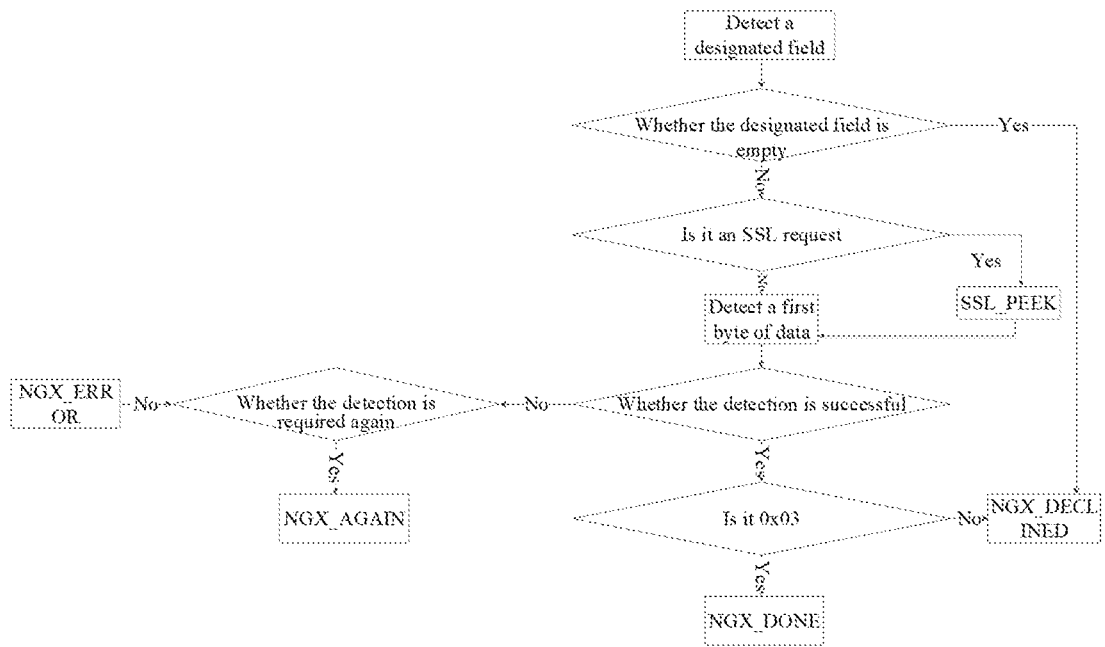
FIG. 3 is a flowchart of an RTMP module executing a protocol detection function in an embodiment of the present disclosure.

Referring to FIG. 3, in this embodiment, when using the protocol detection function of the RTMP protocol to detect the target protocol corresponding to the connection request, the RTMP module may first judge whether the designated field of the HTTP protocol is empty. If the designated field is empty, it means that the listening structure of the RTMP protocol is not written into the designated field, which further indicates that the current port is not shared by the RTMP protocol and the HTTP protocol. At this time, it may be directly determined that the target protocol corresponding to the connection request is not the RTMP protocol, and the indicator NGX_DECLINED indicating that the detection is to be continued is returned, thereby continuing to use the next protocol detection function to detect the target protocol corresponding to the connection request. If the designated field is not empty, it means that the current port is shared by multiple protocols. At this time, it may be further judged which protocol the connection request actually corresponds to.

In this embodiment, when it is determined that the designated field is not empty, it is still possible to judge whether the connection request is the SSL request first and read the partial data of the connection request by the data reading mode that matches the judgment result, so as to detect the target protocol corresponding to the connection request through the read partial data. Specifically, if the connection request is the SSL request, data of one byte may be obtained through calling the data snoop function SSL_peek, while if the connection request is the non-SSL request, the data of one byte may be obtained through setting the parameter MSG_PEEK in the reading processing function recv. Then, it may be judged whether the data of the byte is 0x03. If the data of the byte is 0x03, it indicates that the target protocol corresponding to the connection request is the RTMP protocol. At this time, the indicator NGX_DONE may be returned, which means that the target protocol corresponding to the connection request has been identified. Subsequently, the initialization function of the RTMP protocol may be called to process the connection request. In the initialization function of the RTMP protocol, in order to obtain the configuration information of the RTMP protocol, the listening structure of the RTMP protocol may be read from the designated field so as to obtain the configuration information of the RTMP protocol, and then the connection request may be processed through the configuration information.

In this embodiment, if data of one byte has not been obtained, the indicator NGX_AGAIN may be returned to continue to obtain data. If the obtained data of the byte is not 0x03, then the indicator NGX_DECLINED may be returned for detection through the next protocol detection function.

In one embodiment, when performing the protocol detection, an HTTP/2 module may first judge whether the current listening structure has configuration information of the HTTP/2 protocol. If the current listening structure does not have the configuration information of the HTTP/2 protocol, the indicator NGX_DECLINED may be directly returned, which means that the target protocol corresponding to the connection request is not the HTTP/2 protocol, and the target protocol corresponding to the connection request is then to be detected through the next protocol detection function. And if the current listening structure has the configuration information of the HTTP/2 protocol, partial data of the connection request may be read according to a similar protocol detection process, so as to detect the target protocol corresponding to the connection request through the read partial data. It should be noted that with respect to the SSL request, since the HTTP/2 protocol has been set as a protocol supported by the SSL request in the handshake phase of the SSL protocol, the step of detecting the target protocol corresponding to the connection request may be omitted and the SSL request may be directly processed through the initialization function of the HTTP/2 protocol. For example, the way of HTTP/2 over SSL is to directly set the protocol to the HTTP/2 protocol through application-layer protocol negotiation/next protocol negotiation (ALPN/NPN) in the handshake phase of the SSL protocol. At this time, when the handshake of the SSL protocol is completed, a control right has already been handed over to the HTTP/2 protocol, then the initialization function ngx_http_v2_init of the HTTP/2 protocol may be directly called to process the connection request without the protocol detection process.

In this embodiment, when none of the newly added protocol detection functions is able to detect the target protocol corresponding to the connection request, the connection request may be finally handed over to the HTTP protocol for processing.

Figure 4:
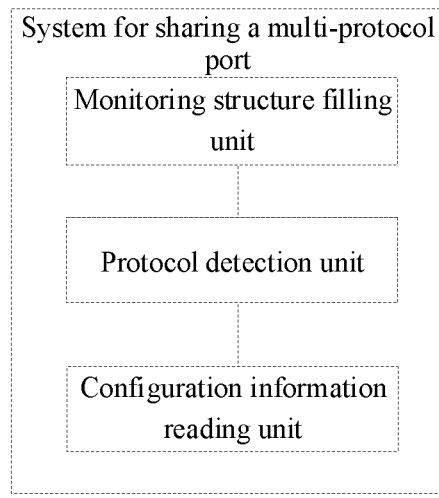
FIG. 4 is a schematic diagram of functional modules of a system for sharing a multi-protocol port in an embodiment of the present disclosure.

Referring to FIG. 4, the present disclosure further provides a system for sharing a multi-protocol port, and a designated field for storing a listening structure is newly added to a listening structure of an HTTP protocol. The system includes:

a listening structure filling unit, configured to write, with respect to a target port, a listening structure of a RTMP protocol into the designated field of the HTTP protocol if the HTTP protocol and the RTMP protocol share the target port;

a protocol detection unit, configured to detect a target protocol corresponding to a connection request when the connection request is received by the target port; and a configuration information reading unit, configured to read the listening structure of the RTMP protocol from the designated field to obtain configuration information of the RTMP protocol if the target protocol is the RTMP protocol, and process the connection request through the configuration information of the RTMP protocol.

Figure 5:
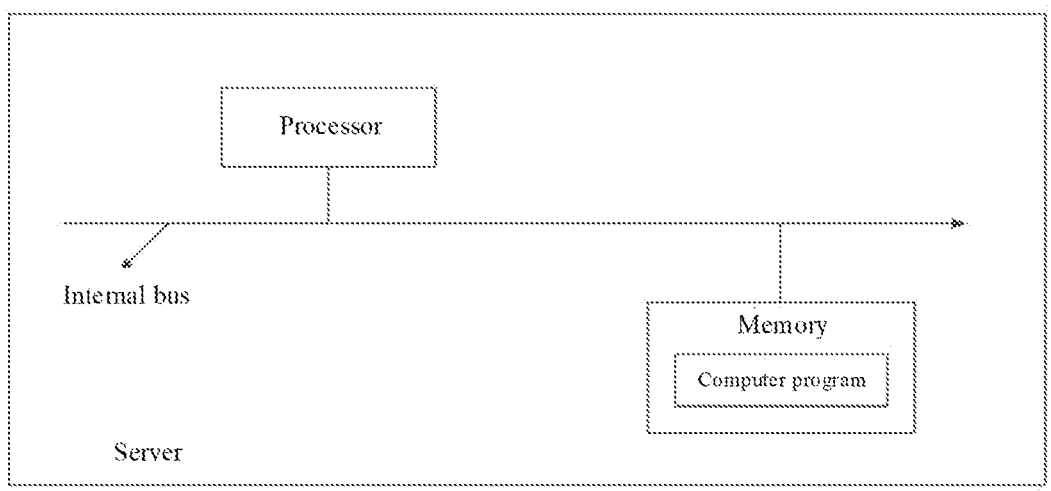
FIG. 5 is a schematic structural diagram of a server in an embodiment of the present disclosure.

Referring to FIG. 5, the present disclosure further provides a server in which an Nginx system is deployed. The server includes a memory and a processor, where the memory is configured to store a computer program which, when executed by the processor, causes the processor to perform the method for sharing the multi-protocol port as described above.

In the present disclosure, the memory may include a physical device for storing information, and the information usually may be digitized and then stored in mediums such as a electrical medium, a magnetic medium, an optical medium or the like. The memory may further include a device for storing the information by means of electric energy such as RAM, ROM, or the like, a device for storing the information by means of magnetic energy such as a hard disk, a floppy disk, a magnetic tape, a magnetic core memory, a magnetic bubble memory or a U-disk, and a device for storing the information by means of optics such as a CD or a DVD. It is certain that there are other types of the memories, such as a quantum memory, a graphene memory, or the like.

In the present disclosure, the processor may be implemented in any suitable manner. For example, the processor may take the form of, for example, a microprocessor or a processor, a computer readable medium storing a computer readable program code (e.g., a software or a firmware) executable by the (micro)processor, a logic gate, a switch, an application specific integrated circuit (ASIC), a programmable logic controller, an embedded microcontroller and the like.

It can be seen from the above that in the technical solution provided in one or more embodiments of the present disclosure, the designated field for storing the listening structure may be newly added to the listening structure of the HTTP protocol. When the HTTP protocol and the RTMP protocol share the same target port, the listening structure of the RTMP protocol may be written into the designated field, so that the connection request received by the target port may be uniformly listened by the HTTP protocol first.

Subsequently, with respect to the connection request listened by the HTTP protocol, the target protocol corresponding to the connection request may be detected. If the target protocol is the HTTP protocol, the connection request may be processed normally by the HTTP protocol. If the target protocol is the RTMP protocol, the connection request should be handed over to the RTMP protocol for processing. Specifically, since the listening structure of the RTMP protocol is written into the designated field, the listening structure of the RTMP protocol may be read from the designated field, so that the configuration information of the RTMP protocol may be obtained and the RTMP protocol may process the connection request through the configuration information. Through the above solution, the HTTP protocol may be used to uniformly listen the shared target port, and then a step of the protocol detection is added. The connection request may be handed over to the corresponding protocol for processing, thus avoiding the occurrence of data anomalies.

Each of the embodiments in this specification is described in a progressive manner, and the same or similar parts between the various embodiments may be referred to each other. Each of the embodiments focuses on the differences from other embodiments. In particular, with respect to the embodiments of the system and the server, an explanation may be made with reference to the introduction of the embodiments of the aforementioned system.

Those skilled in the art may appreciate that the embodiments of the present disclosure may be provided as a method, a system or a computer program product. Therefore, the present disclosure may take the form of an entirely hardware embodiment, an entirely software embodiment, or an embodiment combining software and hardware. Furthermore, the present disclosure may take the form of a computer program product implemented on one or more computer-usable storage media (including but not limited to a disk storage, a compact disc read-only memory (CD-ROM), an optical storage, etc.) containing a computer-usable program code therein.

The present disclosure is described with reference to flowcharts and/or block diagrams of the method, device (system), and computer program product according to the embodiments of the present disclosure. It should be appreciated that each flow and/or block in the flowcharts and/or block diagrams and a combination of the flow and/or the block in the flowcharts and/or block diagrams may be implemented via computer program instructions. These computer program instructions may be provided to a processor of a general-purpose computer, a dedicated computer, an embedded processor or other programmable data processing devices to produce a machine, so that the instructions executed by the processor of the computer or the other programmable data processing devices may produce a device for implementing functions designated in one or more flows in the flowcharts and/or one or more blocks in the block diagrams.

These computer program instructions may also be stored in a computer readable memory capable of directing the computer or the other programmable data processing devices to work in a specific mode, so that the instructions stored in the computer readable memory may produce a manufacture including an instruction device, and the instruction device may implement the functions designated in one or more flows in the flowcharts and/or one or more blocks in the block diagrams.

These computer program instructions may also be loaded onto the computer or the other programmable data processing devices, so that a series of operational steps may be performed on the computer or the other programmable devices to produce a computer-implemented processing, such that the instructions executed on the computer or the other programmable devices may provide steps for implementing the functions designated in one or more flows in the flowcharts and/or one or more blocks in the block diagrams.

In a typical configuration, a computing device includes one or more processors (CPU), input/output interfaces, network interfaces and a memory.

The memory may include forms of a non-permanent memory, a random access memory (RAM), and/or a non-volatile memory in the computer readable medium, such as a read only memory (ROM) or a flash RAM. The memory is an example of the computer readable medium.

The computer readable medium, including permanent and non-permanent, removable and non-removable media, may implement information storage by any method or technology. The information may be a computer readable instruction, a data structure, a module of the program, or other data. Examples of the computer storage medium include, but not limited to, a phase change RAM (PRAM), a static random access memory (SRAM), a dynamic random access memory (DRAM), other types of random access memory (RAM), the read only memory (ROM), an electrically erasable programmable read only memory (EEPROM), a flash memory or other memory technologies, a compact disc read-only memory (CD-ROM), a digital versatile disk (DVD) or other optical storage, a magnetic cassette, a magnetic tape magnetic disk storage or other magnetic storage devices or any other non-transmission medium, which may be used to store the information accessible by the computing device. As defined herein, the computer readable medium does not include a temporary computer readable medium (transitory media) such as a modulated data signal and a carrier wave.

It should be noted that in this document, the terms "include", "contain" or any other variant thereof are intended to cover a non-exclusive inclusion, such that a process, method, commodity, or device including a list of elements includes not only those elements, but also other elements not explicitly listed or inherent to such process, method, commodity, or device. Without further limitation, the element defined by the statement "includes a . . . " does not exclude the presence of another identical element in the process, method, commodity or device that includes the element.

The above description is only an embodiment of the present disclosure and is not intended to limit the present disclosure. For those skilled in the art, the present disclosure may have various modifications and changes. Any modification, equivalent substitution, improvement and the like made within the spirit and principle of the present disclosure shall be contained within the scope of the claims of the present disclosure.

What is claimed is:

1. A method for processing connection requests received at a multi-protocol port, wherein a designated field for storing a listening structure is newly added to a listening structure of an HTTP protocol; and the method comprises:
   writing, with respect to a target port, a listening structure of a RTMP protocol into the designated field of the HTTP protocol in response to the HTTP protocol and the RTMP protocol sharing the target port, wherein an initialization function provided by a core module of the RTMP protocol is executed to detect the target port shared by the HTTP protocol and the RTMP protocol;

setting the listening structure of the RTMP protocol to an ignore state to cause the RTMP protocol not to listen the target port after writing the listening structure of the RTMP protocol into the designated field of the HTTP protocol;

detecting a target protocol corresponding to a connection request in response to the connection request being received by the target port; and reading the listening structure of the RTMP protocol from the designated field to obtain configuration information of the RTMP protocol in response to the target protocol being the RTMP protocol, and processing the connection request using the configuration information of the RTMP protocol.

2. The method according to claim 1, wherein the method further comprises:

newly adding a protocol detection module in an Nginx, wherein a hook injection interface and a hook chain execution interface is provided in the protocol detection module; wherein different protocols hook respective protocol detection functions that are newly added into a hook through the hook injection interface, and the hook chain execution interface is configured to traverse each of the protocol detection functions hooked into the hook to detect the target protocol corresponding to the connection request.

3. The method according to claim 1, wherein the method further comprises: traversing a listening link list, wherein the listening structure in the ignore state is not counted when the listening link list is traversed so that an epoll operation is not performed on the listening structure in the ignore state.

4. The method according to claim 1, wherein the connection request is accessed from a listening processing function of the HTTP protocol; after the connection request is received, detecting the target protocol corresponding to the connection request comprises:

judging whether the connection request is an SSL request, and reading partial data of the connection request by a data reading mode that matches a judgment result to detect the target protocol corresponding to the connection request through the partial data that is read; wherein the data reading mode comprises a mode through calling a data snoop function SSL_peek or a mode through setting a parameter MSG_PEEK in a reading processing function recv.

5. The method according to claim 3, wherein after determining that the connection request is the SSL request, the method further comprises:

rewriting an original epoll read-write processing function into a read-write processing function of an SSL protocol to obtain the partial data of the connection request through the read-write processing function of the SSL protocol; and setting a protocol detection processing function to detect the target protocol corresponding to the connection request through the protocol detection processing function that is set.

6. The method according to claim 1, wherein detecting the target protocol corresponding to the connection request comprises:

judging whether the designated field is empty when using a protocol detection function of the RTMP protocol to detect the target protocol corresponding to the connection request, determining that the target protocol corresponding to the connection request is not the RTMP protocol if the designated field is empty, and continuing to detect the target protocol corresponding to the connection request through a next protocol detection function.

7. The method according to claim 6, wherein the method further comprises:

judging whether the connection request is an SSL request if the designated field is not empty, and reading partial data of the connection request by a data reading mode that matches a judgment result to detect the target protocol corresponding to the connection request through the partial data that is read.

8. The method according to claim 1, wherein the method further comprises:

judging whether a current listening structure has configuration information of an HTTP/2 protocol, determining that the target protocol corresponding to the connection request is not the HTTP/2 protocol if the current listening structure does not have the configuration information of the HTTP/2 protocol, and continuing to detect the target protocol corresponding to the connection request through a next protocol detection function; and reading partial data of the connection request to detect the target protocol corresponding to the connection request through the partial data that is read if the current listening structure has the configuration information of the HTTP/2 protocol.

9. The method according to claim 8, wherein the method further comprises:

omitting a step of detecting the target protocol corresponding to the connection request if the connection request is an SSL request and the HTTP/2 protocol is set as a protocol supported by the SSL request in a handshake phase of an SSL protocol, and using an initialization function of the HTTP/2 protocol to process the SSL request.

10. The method according to claim 1, wherein detecting the target protocol corresponding to the connection request comprises:

executing multiple preset protocol detection functions sequentially to detect partial data of the connection request;

returning an indicator indicating that detection is completed if the target protocol corresponding to the connection request is detected by a current protocol detection function;

returning an indicator indicating that the detection is to be continued to detect the target protocol corresponding to the connection request through a next protocol detection function if the target protocol corresponding to the connection request is not detected by the current protocol detection function; and returning an indicator indicating that the detection ends if multiple protocol detection functions are all executed and the target protocol corresponding to the connection request is not detected.

11. The method according to claim 10, wherein detecting the partial data of the connection request comprises:

determining a target length of the partial data required to be read according to a type of the current protocol detection function; and returning an indicator indicating that the detection is continued to wait for more data to be read until a length of the data that is read reaches the target length if the length of the data that is currently read does not reach the target length.

12. A server in which an Nginx system is deployed, comprising a memory and a processor, wherein the memory is configured to store a computer program which, when executed by the processor, causes the processor to perform a method for processing connection requests received at a multi-protocol port; wherein a designated field for storing a listening structure is newly added to a listening structure of an HTTP protocol; and the method comprises:

writing, with respect to a target port, a listening structure of a RTMP protocol into the designated field of the HTTP protocol in response to the HTTP protocol and the RTMP protocol sharing the target port, wherein an initialization function provided by a core module of the RTMP protocol is executed to detect the target port shared by the HTTP protocol and the RTMP protocol;

setting the listening structure of the RTMP protocol to an ignore state to cause the RTMP protocol not to listen the target port after writing the listening structure of the RTMP protocol into the designated field of the HTTP protocol;

detecting a target protocol corresponding to a connection request in response to the connection request being received by the target port; and reading the listening structure of the RTMP protocol from the designated field to obtain configuration information of the RTMP protocol in response to the target protocol being the RTMP protocol, and processing the connection request through the configuration information of the RTMP protocol.

13. The server according to claim 12, wherein the method further comprises:

newly adding a protocol detection module in an Nginx, wherein a hook injection interface and a hook chain execution interface is provided in the protocol detection module; wherein different protocols hook respective protocol detection functions that are newly added into a hook through the hook injection interface, and the hook chain execution interface is configured to traverse each of the protocol detection functions hooked into the hook to detect the target protocol corresponding to the connection request.

14. The server according to claim 12, wherein the method further comprises:

traversing a listening link list, wherein the listening structure in the ignore state is not counted when the listening link list is traversed so that an epoll operation is not performed on the listening structure in the ignore state.

15. The server according to claim 12, wherein the connection request is accessed from a listening processing function of the HTTP protocol; after the connection request is received, detecting the target protocol corresponding to the connection request comprises:

judging whether the connection request is an SSL request, and reading partial data of the connection request by a data reading mode that matches a judgment result to detect the target protocol corresponding to the connection request through the partial data that is read; wherein the data reading mode comprises a mode through calling a data snoop function SSL_PEEK or a mode through setting a parameter MSG_PEEK in a reading processing function recv.

16. The server according to claim 15, wherein after determining that the connection request is the SSL request, the method further comprises:

rewriting an original epoll read-write processing function into a read-write processing function of an SSL protocol to obtain the partial data of the connection request through the read-write processing function of the SSL protocol; and setting a protocol detection processing function to detect the target protocol corresponding to the connection request through the protocol detection processing function that is set.

17. The server according to claim 12, wherein detecting the target protocol corresponding to the connection request comprises:

judging whether the designated field is empty when using a protocol detection function of the RTMP protocol to detect the target protocol corresponding to the connection request, determining that the target protocol corresponding to the connection request is not the RTMP protocol if the designated field is empty, and continuing to detect the target protocol corresponding to the connection request through a next protocol detection function.

18. The server according to claim 17, wherein the method further comprises:

judging whether the connection request is an SSL request if the designated field is not empty, and reading partial data of the connection request by a data reading mode that matches a judgment result to detect the target protocol corresponding to the connection request through the partial data that is read.

\* \* \* \* \*